United States Patent Office 3,221,061
Patented Nov. 30, 1965

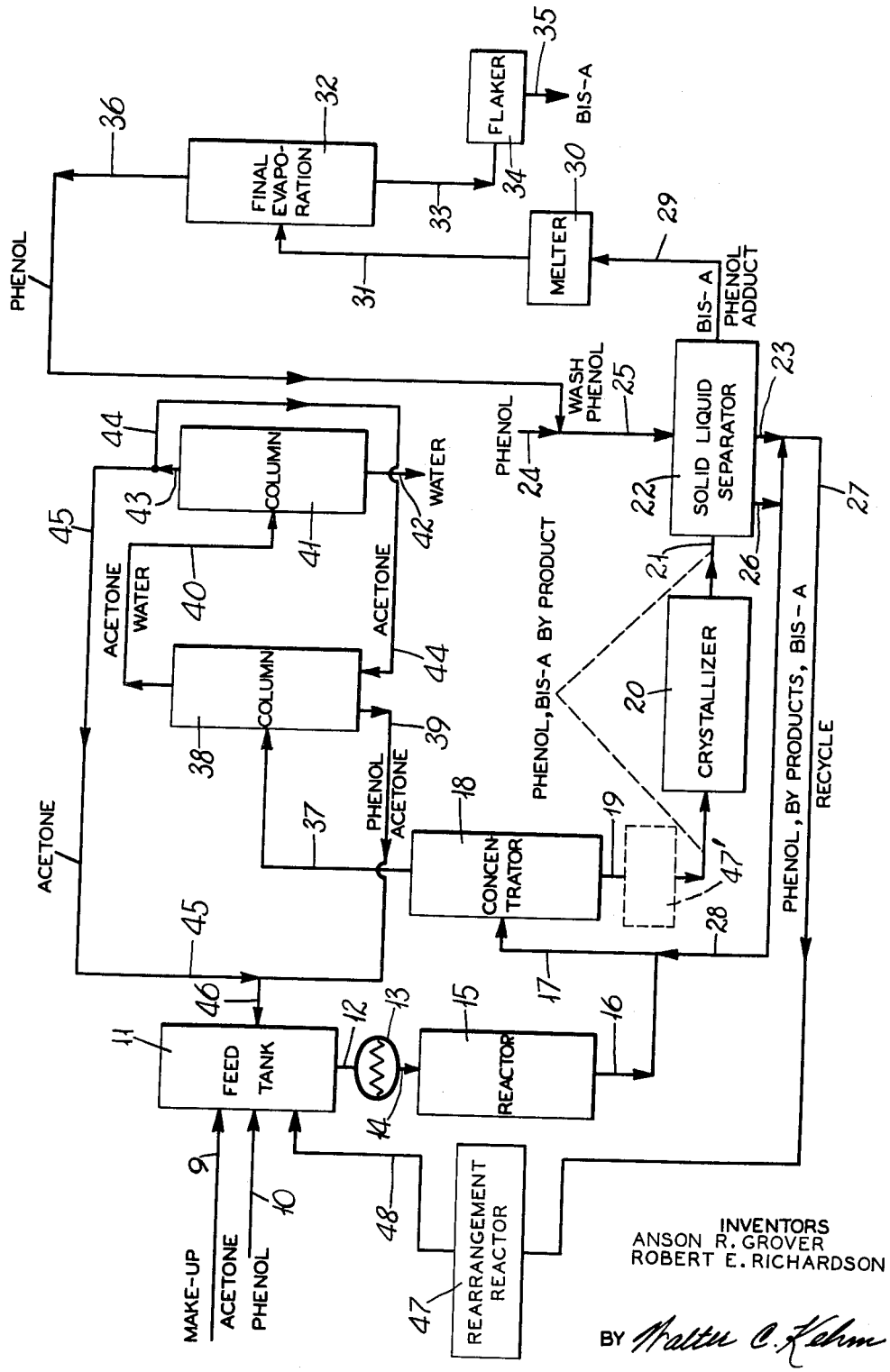

3,221,061
PROCESS FOR THE PRODUCTION OF 2,2-BIS-(4-HYDROXYPHENYL) PROPANE
Anson R. Grover, Plainfield, and Robert E. Richardson, Bloomfield, N.J., assignors to Union Carbide Corporation, a corporation of New York
Filed Aug. 1, 1961, Ser. No. 128,523
4 Claims. (Cl. 260—619)

This invention relates to the production of 2,2-bis(4-hydroxyphenyl)propane. More particularly, it relates to an improved continuous process for the production of ultra-high purity 2,2-bis(4-hydroxyphenyl)propane.

Processes presently employed in the art cannot supply commercial quantities of 2-2-bis(4-hydroxyphenyl)propane with a sufficient degree of purity for all applications. For example, large quantities of 2,2-bis(4-hydroxyphenyl)propane are used as a basic starting material in the burgeoning field of epoxy resins and also in the more recent rapidly expanding field of polycarbonate and polyhydroxyether resins. Epoxy resin applications require a 2,2-bis(4-hydroxyphenyl)propane of at least 92% purity, and polycarbonate and polyhydroxyether resin applications require a 2,2-bis(4-hydroxyphenyl)propane starting material of even higher purity.

The presence of more than slight amounts of impurities has been found to have a disproportionately deleterious effect on the quality of these polymers. Known purification procedures can upgrade commercially available 2,2-bis(4-hydroxyphenyl)propane to a purity of about 96%. This is generally sufficient for epoxy resin applications, but only complex purification procedures are able to provide a higher purity 2,2-bis(4-hydroxyphenyl)propane starting material necessary for polycarbonate or polyhydroxyether resin production. In addition, these purification procedures are costly in time, equipment, and material consumed. Processes currently employed for production of 2,2-bis(4-hydroxyphenyl)propane condense phenol with acetone in the presence of a mineral acid condensing agent or condensation catalyst. The stronger mineral acids such as sulfuric acid and hydrochloric acid are commonly used, and even preferred, in these processes despite the operating difficulties they present. Even with the use of these powerful catalysts, known processes require extended periods of contact between the reactants and the catalysts. Contact times of from 10 to 16 hours and longer are not uncommon. Efforts to reduce the length of contact time which is, of course, economically critical in a commercial process have heretofore involved either additional processing steps or the use of catalyst promoters.

For example, it has been suggested to include a soaking step following the condensation reaction. This expedient is in essence merely a two-step reaction and reduces the contact period only slightly over an identical reaction carried out without the soaking step and does not significantly increase product purity over previously achieved levels. Mineral acid-catalyzed acetone and phenol condensations are disadvantageous in the time required for reaction and the product obtained has a purity of only 75% to about 92% at best. This level of purity is completely unsuitable for starting material in polycarbonate or polyhydroxyether resin production and only barely suitable as a starting material for epoxy resin production even after being upgraded.

The use of catalyst promoters is known to markedly increase the rate of condensation of phenol and acetone to 2,2-bis(4-hydroxyphenyl)propane. Product contamination, however, is commensurately increased. Materials ordinarily employed as acetone and phenol condensation reaction promoters are solid, liquid or gaseous sulfur-containing compounds which are soluble in the reaction mixture. In all heretofore known reactions these materials or their reaction by-products have invariably occurred as impurities in the product. These impurities, which impart both a characteristic odor and a distinct color to the 2,2-bis(4-hydroxyphenyl)propane, are removable only with difficulty, if at all. Separation difficulties have thus far substantially negated the advantages in rate obtained with promoters used in conjunction with mineral acid catalysts in known commercial processes. As a result, presently employed processes compromise either speed of reaction by excluding promoters or purity of product by utilizing them.

Because large commercial quantities of 2,2-bis(4-hydroxyphenyl)propane having a purity above about 92 percent are not available at the present time, the best available grades of 2,2-bis(4-hydroxyphenyl)propane, 92% pure, are further purified, e.g. by recrystallization from phenol. Recovery of the purified product from the recrystallization procedure varies from about 50 percent to a rarely achieved 90 percent and hence adds considerably to the cost of the 2,2-bis(4-hydroxyphenyl)propane product finally obtained.

In answer to the need in the art for a continuous process for the production of ultra-high purity 2,2-bis(4-hydroxyphenyl)propane at a cost sufficiently low to provide the rapidly growing epoxy resin, polycarbonate resin and polyhydroxyether resin industries with the basic raw material upon which these industries depend there was developed a process which consistently provided an ultra-high purity bisphenol, free of all traces of either catalyst or promoter and substantially completely free of by-products without extensive purification steps and all with process efficiencies which approached 100% at steady state conditions.

This process, described and claimed in U.S. patent application Serial No. 768,409 filed October 20, 1959, by F. N. Apel, P. Farevaag and H. L. Bender, now U.S. Patent 3,049,569, comprised in essence continuously contacting under substantially anhydrous conditions a mixture of acetone and phenol wherein phenol is present in an amount in excess of stoichiometric proportions, with a substantially insoluble cationic exchanging resin at a temperature from about 30° C. to 125° C. to effect the inter-reaction between phenol and at least a part of the acetone, separating the effluent from the reaction zone into two streams, one containing a 2,2-bis-(4-hydroxyphenyl)propane-phenol adduct, reaction by-products and some free phenol and separating this 2,2-bis(4-hydroxyphenyl)propane from the reaction by-products and free phenol in the first stream; and preferably dehydrating the second stream containing the acetone, water and the remainder of the free phenol and recycling the reaction by-products, dry acetone and phenol to the reaction zone.

As disclosed in the Apel et al. application Serial No. 768,409 there is produced in addition to the desired 2,2-bis(4-hydroxyphenyl)propane product a number of reaction by-products. Surprisingly, it was there found that by recycling the by-products a steady state concentration thereof was reached and subsequent reaction of phenol and acetone was practically 100% efficient. Normally, the steady state concentration of by-products obtained under recycle conditions when operating at the preferred conditions of molar ratios of reactants, temperature, catalyst, percent reaction, et cetera is approximately 40% by weight on a phenol-free basis. That is, approximately 40% by weight of the effluent mixture from the reaction zone, disregarding the phenol present, comprises acetone-phenol reaction products other than 2,2-bis(4-hydroxyphenyl)propane. The same reaction conditions, but using virgin raw materials, however, produces an equilibrium concentration of acetone-phenol reaction by-products of only about 20% by weight. Therefore, there is a theoretical possibility of lowering the steady state by-product concentration obtained under recycle conditions by about 50%.

The advantage flowing from lowered steady state by-product concentration is chiefly increased crude product purity which in turn simplifies obtaining of ultra-high purity bisphenol product. Therefore, a lowering of steady state by-product concentration would directly enhance product purity and likely increase process productivity, or in other words improve the process of the Apel et al. application Serial No. 786,409 mentioned above.

Ordinarily it would be expected that a lengthening of reaction time, i.e. time of contact between reactants in the reaction zone would enable the manufacturer to approach equilibrium concentration at steady-state conditions. This expedient has not worked, however, in the cation exchange-resin catalyst phenol-acetone reaction for reasons hereinafter explained.

It is an object, therefore, of the present invention to provide an improved continuous cation exchanging resin catalyzed process for the production of ultra-high purity 2,2-bis(4-hydroxyphenyl)propane.

It is another object to provide a cation exchanging resin catalyzed process for the continuous production of 2,2-bis(4-hydroxyphenyl)propane wherein the steady-state concentration of acetone-phenol by-products is more nearly equal to the equilibrium concentration than has been achieved heretofore. Other objects will appear hereinafter.

We have now discovered that the steady-state concentration of acetone-phenol reaction by-products in the reaction zone of the Apel et al. process described above can be lowered to more closely approach the equilibrium concentration by effecting outside of the reaction zone a rearrangement of at least a portion of the acetone-phenol reaction by-products to 2,2-bis(4-hydroxyphenyl)propane. The process in general comprises concentrating the effluent mixture from the reaction zone by separating therefrom substantially all the water of condensation and unreacted acetone, passing the concentrated effluent mixture to a rearrangement zone comprising a porous mass of substantially insoluble phenol solvent-saturated cation exchange resin, further reacting the acetone-phenol reaction by-products to 2,2-bis(4-hydroxyphenyl)propane and returning the product enriched effluent mixture to the reaction zone with additional phenol and acetone. The feed to the rearrangement zone is preferably low in 2,2-bis(4-hydroxyphenyl)propane content. This condition is achieved by removing the 2,2-bis(4-hydroxyphenyl)propane as an equimolar adduct with phenol from the effluent mixture prior to the introduction thereof into the rearrangement zone.

Surprisingly, introduction of an extra-reaction zone rearrangement step enables a substantial decrease in steady-state by-product concentration, although prolonged contact of reactants in the phenol-acetone zone wherein rearrangement also is known to take place does not provide such a decrease. We do not wish to be bound to any particular theoretical explanation, but it is believed that the superior results of the method of this invention are attributable to carrying out the rearrangement reaction in the substantially complete absence of water. The presence of even slight amounts of water, i.e. above about 1.5% by weight of the by-product containing mixture completely inhibits the formation, by rearrangement, of 2,2-bis-(4-hydroxyphenyl)propane. Therefore in the phenol-acetone condensation reaction wherein water is formed and is commonly in excess of 1.5% by weight even protracted reaction times will not provide substantially decreased by-product concentration since the rate of rearrangement of by-products of 2,2-bis-(4-hydroxyphenyl)propane in the reaction zone by cation exchanging resin catalyst reaches a negligible level well before the theoretical equilibrium concentration is achieved.

The size and dimensions of the condensation reaction and rearrangement zones are not critical, provided adequate contact of the respective mixtures with the cation exchanging resin is obtained. Suitable zones, for example, are those of enlarged cross sections such as a chamber, tank, autoclave or the like and those of restricted cross sections such as tubular vessels and coils or the like. A plurality of reaction or rearrangement zones connected for series or parallel flow can be employed within the scope of the invention. Suitably they are equipped with means for maintaining or adjusting the temperature within the respective zones and means for preventing entrainment of the catalyst in their effluents.

*Condensation reaction*

The time of residence of the acetone and phenol in the reaction zone can be varied considerably. It is dependent primarily on the specific molar ratio of the reactants, the amount and exchange capacity of the cation exchanging catalyst employed, temperatures used, percent conversion desired, and similar factors. Residence time in the reaction zone, as a minimum, is the time sufficient to initiate the reaction and, as a maximum, the time sufficient to substantially complete interreaction between the reactants present. Ordinarily, at least 5% of the acetone is reacted and desirably not more than 95% on a molar basis. We prefer a 20% conversion of acetone as a minimum and a 80% conversion as a maximum. We particularly prefer a conversion of about 50%, since at increased conversions the reaction rate declines and the process becomes less economical in terms of amount of product per unit time. No particular residence time is critical in the present invention with regard to yield, the same extremely high yields being obtained with comparatively short contact times and low conversion as are achieved with long contact times and high conversions. Contact times of as little as one hour and a conversion of about 50% is the most desirable, since it provides yields at steady state of about 99% of the theoretical, based on acetone consumed, of 2,2-bis(4-hydroxyphenyl)propane.

"Phenol" as used herein refers to $C_6H_5OH$, phenyl hydroxide, only and "acetone" to dimethyl ketone only.

The acetone-phenol reaction is preferably carried out with an amount of phenol in excess of stoichiometric quantities, i.e. more than 2 moles of phenol per mole of acetone present in the reaction zone, and preferably between about 3 to 20 moles of phenol per mole of acetone. The higher ratios of phenol to acetone, i.e. about 12:1 or more are desirable where the temperature of the reaction zone is comparatively low since this inhibits clogging of the reaction zone with solidified reaction products or crystallized adducts of phenol with the reaction products. A molar ratio of 6:1 to 12:1 of phenol to acetone is particularly preferred. At a conversion of 50% based on the acetone consumer, a phenol to acetone molar ratio of 10:1 is particularly preferred.

It is essential in order to maintain high rates of 2,2-bis(4-hydroxyphenyl)propane formation in continuous operation that substantially anhydrous reactants, i.e., containing less than 2.0 percent by weight water, be fed to the reaction zone, since the overall efficiency of the process of the invention is dependent upon the presence of less than 2.0 percent of water in the reaction zone for optimum catalysis with the cation exchanging resins.

The temperature within the reaction zone should be such as will maintain the reactants in the liquid phase. In general, the lower the temperature employed in the reaction zone, the lower the concentration of 2,2-bis(4-hydroxyphenyl)propane should be in order to avoid plugging the column by solidified 2,2-bis(4-hydroxyphenyl)propane or its crystallized adduct with phenol. The use of temperatures which are so high as to cause degradation of the reactants, the 2,2-bis(4-hydroxyphenyl)propane or the cation exchanging resin, or which cause an undue rate of by-product formation is to be avoided. The specific temperature employed in the reaction zone can be varied from about 30° C. to 125° C. depending upon the other operating conditions within the reaction zone, such as a percent conversion per pass, residence time or length of time of contact between catalyst and reactants, pressure, and the like. In order to avoid plugging of the reaction zone with solidified reaction products, which may occur at temperatures much below 40° C. and in order to achieve good rates of production of 2,2-bis(4-hydroxyphenyl)propane, temperatures preferably range from about 40° C. to about 100° C.

Optimum results both as regards rate of reaction and yield are obtained by the use of temperatures within the range of 70° C. to 90° C. and these temperatures are, therefore, particularly preferred. The reaction zone can be maintained at atmospheric, sub-atmospheric or super-atmospheric pressures. An inert atmosphere can also be employed within the reaction zone. In general, the use of atmospheric pressure or a slightly elevated pressure is preferred to ensure adequate flow of materials through the system in continuous operations.

*Rearrangement reaction*

The time of residence of the effluent mixture in the rearrangement zone can vary considerably and depends primarily on the extent of rearrangement desired, temperatures employed, and the exchange capacity of the cation exchanging catalyst used. Residence time, as a minimum, is the time sufficient to initiate the rearrangement reaction and, as a maximum, the time sufficient to substantially complete rearrangement of the reaction by-products to 2,2-bis(4-hydroxyphenyl)propane, i.e. to permit equilibrium to be established.

In carrying out the rearrangement step in the process of this invention the effluent mixture is first stripped of substantially all unreacted acetone and water of condensation. At this point the effluent mixture comprises: phenol; the acetone-phenol product, the 2,2-bis(4-hydroxyphenyl)propane; and a variety of acetone-phenol reaction by-products, e.g., 4-p-hydroxyphenyl-2,2,4-trimethylchroman (Dianin's compound), triphenols and 2,4'-dihydroxy-2,2-diphenyl propane, which herein are generically termed "acetone-phenol reaction by-products." The 2,4'-isomer is the predominant acetone-phenol reaction by-product.

It is critical in order to effect the rearrangement of these reaction by-products to 2,2-bis(4-hydroxyphenyl)-propane that the rearrangement zone be essentially anhydrous, i.e. contain less than 1.5% by weight water based on the weight of the effluent mixture entering the rearrangement zone. As pointed out above greater than 1.5% water completely inhibits the rearrangement reaction. Anhydrous conditions, i.e. less than 0.5% water in the rearrangement zone is preferred for obtaining best rates of rearrangement.

The temperature within the rearrangement zone can be varied over a range of 50–100° C. At the high end of the range the rate of rearrangement is greatest but the equilibrium proportion of by-products is also increased; and conversely at the lower end of the range the equilibrium proportion is lowest but the rate of rearrangement is least. Therefore, it is desirable to compromise between rearrangement rate and by-product equilibrium concentration by employing rearrangement zone temperatures of from about 60° C. to 90° C. A temperature of about 75° C. for the size rearrangement zone described in the examples and with the catalyst used there is preferred for obtaining the optimum rates and equilibrium concentration. Suitably a series of rearrangement zones is provided heated to progressively lower temperatures whereby rapid initial rearrangement effected and yet low final equilibrium concentration is secured.

The rearrangement zone can be maintained at atmospheric, sub-atmospheric or super-atmospheric pressures. An inert gas atmosphere can also be employed. In general the use of atmospheric pressure or a slightly elevated pressure is preferred to ensure adequate flow of materials through the system in continuous operations.

We employ cation exchange resins as solid catalysts in the condensation and rearrangement steps of the continuous process of our invention. These resins are insoluble in the reaction and effluent mixtures and, hence, the problem of catalyst separation from the condensation reaction zone or rearrangement zone effluent and the removal of small amounts of catalyst impurities in the product is obviated. Throughout the condensation and rearrangement steps and isolation steps the catalyst remains in the reaction or rearrangement zone and does not appear elsewhere in the process equipment. Its service life in this process is indefinitely long. Cation exchanging resins do not of necessity have to be regenerated if care is exercised in preventing the introduction of basic metal ions such as sodium, potassium, calcium, etc. or other contaminants which inactivate the cation exchanging groups of the resin. The use of the insoluble catalyst confers the additional advantages of (1) eliminating the need for acid corrosion resistant equipment which is otherwise essential and (2) making unnecessary the neutralization steps which are common to other processes.

The ion exchange resins useful in our process are substantially insoluble polymeric skeletons with cationic exchanging groups chemically bound thereto. The exchange potential of the bound acidic groups and the number of such groups available for contact with the phenol and acetone reaction mixture or the effluent mixture determines the catalytic effectiveness of a particular ion exchange resin. Thus, although the number of acidic groups bound to the polymeric skeleton of the resin determines the theoretical "exchange capacity" thereof, a more accurate criterion of catalytic effectiveness is the number of acidic groups available for contact with the reactants. This contact can occur on the surfaces, both interior and exterior of the ion exchange resin. Therefore, a form of resin which provides a maximum amount of surface area, e.g., porous microspheres or beads, is highly desirable and affords the highest rate of conversion and rearrangement reaction and greatest economy in this process. The particular form of the ion exchange resin used, however, is not critical.

The ion exchange resins should be substantially insoluble in the reaction mixture and in any solvent to which the resin may be exposed in service. Resin insolubility is generally due to a high degree of cross-linking within the resin but can be caused by other factors, e.g. high molecular weight or a high degree of crystallinity.

In general, the greater the exchange capacity of a resin, i.e. the greater the number of milliequivalents of acid per gram of dry resin, the more desirable the resin is for use in our process. Resins having an exchange capacity greater than about two milliequivalents of acid per gram of dry resin are preferred. Particularly preferred are resins with bound cationic exchanging groups of the stronger exchange potential acids. Results obtained with bound sulfonic acid groups have been highly satisfactory. Among the ion exchange resins which are highly suited to use in our process are: sulfonated styrene-divinylbenzene copolymers, sulfonated cross-linked styrene polymers, phenol-formaldehyde-sulfonic acid resins, benzene-formaldehyde-sulfonic acid resins, and the like. Most of these resins and many others are available commercially under trade names such as: Amberlite XE–100 (Rohm and Haas Co.); Dowex 50–X–4 (Dow Chemical Co.); Permutit QH (Permutit Co.); and Chempro C–20 (Chemical Process Co.)

Many ion exchange resins are received from the manufacturer in the form of the sodium or other salt and must be converted to the hydrogen or acid form prior to use in this process. The conversion can be easily accomplished by washing the resin with a solution of a suitable acid. For example, a sulfonated resin can be suitably washed with a sulfuric acid solution. Salts formed during the conversion procedure are conveniently removed by washing the resin with water or solvent for the salt.

It frequently happens as a result of either the washing operation outlined above, or the manufacturer's method of shipping, that the resin will contain from 50 percent to 100 percent of its own weight of water. Substantially all this water, i.e. all but about 2% as a maximum must be removed prior to use of the ion exchange resin as a condensation reaction catalyst in our process, and all but about 1.5% as a maximum must be removed prior to use of the ion exchange resin as a rearrangement reaction catalyst. Suitable methods for removing the water in the resin include drying the resin under reduced pressure in an oven; soaking the resin in liquid anhydrous phenol solvent for a time sufficient to fill the resin interspaces with phenol solvent; and azeotropic distillation of water and phenol in the presence of an excess of phenol.

The resin when once conditioned in this manner to insure anhydrous conditions throughout does not require reconditioning at any time during use in the process. Alternatively, the catalyst can be conditioned after installation in the process equipment merely by running the reaction mixture through the catalyst until substantially all water is removed. In this latter procedure conditioning is accomplished by both the acetone and the phenol.

The term "phenol-solvent saturated cation exchanging resin" is used to describe a preferred form of catalyst for both the condensation and rearrangement reactions. By this term is meant an ion exchange resin which is substantially completely filled or saturated with a phenol solvent e.g. monohydroxy aromatic compounds such as phenol per se, cresols and xylenols. Of course, to avoid output-reducing cross-reactions it is desirable to employ phenol per se as the phenol solvent. The step of phenol solvent saturation activates the catalyst for use in our process as well as excludes adsorbtion of moisture.

It has been found that the catalytic effectiveness of the above-described ion exchange resins in both the condensation and rearrangement reactions is appreciably increased by treating the resin with a mercapto alcohol prior to the use in our process. The presence of free phenol-acetone condensation promoters, such as alkyl mercaptans and mercapto acids in the reaction zone with the ion exchange resins, although increasing the rate of reaction, results in sulfur contamination of the 2,2-bis(4-hydroxyphenyl) propane product similar to that occurring with the use of equivalently promoted mineral acid catalysts. The contamination is manifested by a strong sulfur odor and can not be removed even by successive recrystallizations of the product. Thus, the advantage of a markedly accelerated reaction rate is negated by added contamination of the product.

All the advantages of a promoted reaction can be obtained without concomitantly causing any contamination of the product by esterifying from about 3 percent to about 20 percent of the cation exchanging groups attached to the polymeric resin skeleton with a mercapto alcohol. The use of this promoted catalyst is preferred in our invention because of the faster condenastion and rearrangement reaction rates and the lack of odor or other sulfur contamination in 2,2-bis(4-hydroxyphenyl) propane product prepared with the modified ion exchange resin. The preparation of these partially esterified ion exchange resin catalysts is described in the copending application of F. N. Apel, L. B. Conte, Jr. and H. L. Bender, Serial No. 768,050, filed October 20, 1958 now U.S. Patent 3,049,568 issued August 14, 1962, which is herewith incorporated by reference. Surprisingly, the partial esterification does not cause a decrease in catalytic activity although from 3 to 20% of the catalytic species, the cation exchanging groups, are blocked.

Remarkable efficiencies and economies per pound of catalyst are made possible by the use of solid ion exchange resins. Experimental runs have shown that the resins remain catalytically effective for indefinite periods. 300 pounds of 2,2-bis(4-hydroxyphenyl)propane have been produced per pound of resin without any sign of the catalytic effectiveness abating. Thus, with the above-described resins a process can be run continuously and automatically with no problems of catalyst regeneration.

To initiate the reaction, phenol and acetone, both substantially anhydrous, i.e. less than 2.0 water content by weight as a maximum and preferably anhydrous, i.e. less than 0.2% water content by weight, are heated to reaction temperature and passed into a fixed porous bed of ion exchange resin, preferably downward, at a slight pressure to maintain an adequate rate of flow through the bed, although gravity flow through the column is also satisfactory. The effluent mixture from the catalyst bed is passed through a concentrator, which may be any conventional film type evaporator, preferably one having counter-current vapor liquid flow, where all the water and acetone and a portion of the phenol are removed as overhead.

Depending upon the temperature of the effluent mixture from the reactor and the pressure employed in the concentrator, the reaction mixture may be heated or cooled in order to cause the vaporization of all the water of reaction, and the unreacted acetone. Such vapors are removed overhead, permissibly with some phenol vapors, leaving as a residue or bottoms the 2,2-bis(4-hydroxyphenyl)propane, phenol and acetone-phenol by-products. The temperature of this concentration should not be so high as to cause decomposition of the 2,2-bis(4-hydroxyphenyl)propane and is preferably between about 100° C. and about 150° C., with the operating pressure adjusted such that substantially complete vaporization of the acetone and the water is achieved, and leaving at least one mole of phenol per mole of 2,2-bis(4-hydroxyphenyl)-propane, and preferably 4 to 10 moles of phenol, in the residue along with substantially all the by-products and the 2,2-bis(hydroxyphenyl)propane.

The overhead, comprising acetone, water and phenol, from the concentrator is passed into a dehydrating zone for removal of the water, leaving acetone and phenol which are recycled to the process. This dehydration can be accomplished by contacting the acetone, water and phenol mixture with a rising stream of dry acetone vapors. This avoids the addition of another component to the reaction process and permits recycling of dry phenol and acetone. In this procedure, the mixture is fed to the side of the column and dry acetone is introduced at the bottom of the column which is maintained at a temperature of about 155° C. to 165° C. at atmospheric pressure. The dry acetone passes up the column contacting the feed and effectively removes the water therefrom. The moisture-bearing acetone vapors are taken off at the top of the column which is maintained at a temperature of about 58° C. when operating at atmospheric pressures by controlling the reflux ratio. Control of the temperature at the top of the column is required to insure that a phenol-free acetone-water distillate is passed to the second column where the water is removed by fractional distillation. The recovered dry acetone is recycled.

The bottoms from the first column, consisting of dry phenol and acetone, are recycled to the process.

The water appearing as bottoms from the second column can be discarded without requiring further purification to remove phenol or other organic material.

Any other separation technique which will remove water from the concentrator overhead can also be employed.

In one embodiment of this invention bottoms from the concentrator consisting of 2,2-bis(4-hydroxyphenyl)propane, phenol and by-products are passed directly to a crystallization zone.

The crystallization step is carried out by chilling the bottoms from the concentrator to a temperature between about 37° C. and 95° C. The concentration of the feed to the crystallization zone will vary depending on the operating conditions in the concentrator. By distilling off more or less phenol, the molar ratio of phenol to product in the crystallization zone feed is adjustable. Phenol in excess of one mole per mole of 2,2-bis(4-hydroxyphenyl)propane takes up the by-products, all of which are soluble in phenol in the temperature range of 37° C. to 95° C. along with a portion of 2,2-bis(4-hydroxyphenyl)propane. The greatest portion of the 2,2-bis(4-hydroxyphenyl)propane crystallizes out as an adduct with phenol in 1:1 molar ratio.

The crystals are separated from the mother liquor by centrifugation, filtration, or other suitable means and washed, preferably with additional phenol or a phenol-acetone mixture to remove traces of mother liquor. The washings and mother liquor, which at this point consist of phenol, by-products, and some 2,2-bis(4-hydroxyphenyl)propane are passed to the rearrangement zone.

The washed crystals of the 1:1 adduct of phenol and 2,2-bis(4-hydroxyphenyl)propane are melted and charged to a second evaporation zone wherein phenol is stripped from the 2,2-bis(4-hydroxyphenyl)propane and recycled to the process leaving the 2,2-bis(4-hydroxyphenyl)propane as the bottoms. The 2,2-bis(4-hydroxyphenyl)propane product obtained contains no traces of a catalyst or promoter. Process efficiencies range from 95–99 percent even at product purities of 99% or better.

The phenol, by-products and 2,2-bis(4-hydroxyphenyl)propane containing less than 1.5% by weight water, suitably less than 0.5% and preferably less than 0.2% by weight water are introduced to the rearrangement reactor and passed therethrough desirably under a slight positive pressure. Rearrangement of the reaction by-products to 2,2-bis(4-hydroxyphenyl)propane is effected and the rearrangement zone effluent now enriched in 2,2-bis(4-hydroxyphenyl)propane content is recycled to the reaction zone.

Alternatively, the rearrangement zone can be placed after the concentration and before the crystallization zone either in addition to or instead of the post-crystallization zone rearrangement zone described above. Other process steps remain the same.

In order to set forth more fully the nature of our invention for the steady-state, continuous production of a high purity, 2,2-bis(4-hydroxyphenyl)propane, a preferred embodiment thereof is described hereinbelow in detail with reference to the attached drawing, wherein the single figure illustrates one form of apparatus and sequence of processing steps suitable for carrying out the method of the invention.

Referring to the drawing, the reactor feed is continuously prepared in feed tank 11 from: (1) make-up phenol from line 10; (2) make-up acetone from line 9; (3) a recycled mixture from 46; and (4) the recycled rearranged phenol-acetone mixture of phenol, reaction by-products and bisphenol product from line 48. These four streams are blended in such proportions as will maintain a constant reactor feed composition with respect to all components entering the process.

A comparison of typical material balances at this stage of the process between the processes with and without the rearrangement step follows:

|  | Process Without Rearrangement Step | Process With Rearrangement Step |
| --- | --- | --- |
| Phenol, weight percent | 81.4 | 84.7 |
| Acetone, weight percent | 4.5 | 4.5 |
| Water, weight percent | 0.1 | 0.1 |
| 2,2-bis(4-hydroxyphenyl)propane | 5.4 | 6.4 |
| By-products, weight percent | 8.6 | 4.3 |

It will be noted weight percent by-product concentration is greatly reduced (4.3% vs. 8.6%) at steady state conditions in the feed stream to the reactor.

The intermixed streams forming the reactor feed are continuously passed through line 12, through a pre-heater 13, wherein they are heated to a temperature of about 70° C. to 75° C. prior to entrance into the reaction zone.

The reaction zone comprises a reactor 15 which is suitably an elongated chamber provided with means for heat removal and temperature control, and with a fixed bed of a phenol-solvent saturated cation exchanging resin of the type prepared as described previously, and preferably the sulfonated polystyrene resin crosslinked with divinyl benzene sold as Dowex 50 X-4 which has had about 20% of its available free acid groups esterified with mercapto ethanol promotor as described in the co-pending application of F. N. Apel et al. Serial No. 768,050 referred to above. The resin catalyst is placed in the reactor 15 in a manner which permits flow of the reactor feed through the catalyst bed, and also assures adequate contact of the reactor feed with substantially all the catalyst, and also prevents entrainment of the solid catalyst in the process flowing from the reactor chamber.

The reactor feed after passing through the pre-heater 13 continuously enters the top of the reactor 15, through line 14 at such a rate of flow as to provide an average residence time of reactants with catalyst of about one hour at a controlled temperature of about 75° C. to give a conversion to 2,2 - bis(4-hydroxyphenyl)propane of about 50 mole percent based on acetone. The effluent mixture from the reaction chamber enters line 16, and is mixed with a portion of recycled phenol wash liquor from line 28 and the mixture is passed continuously through line 17 to an evaporation zone.

A comparison of typical material balances at this stage of the process between the process with the rearrangement step and without the rearrangement step follows:

|  | Process Without Rearrangement Step | Process With Rearrangement Step |
| --- | --- | --- |
| Phenol, percent | 74.2 | 77.7 |
| Acetone, percent | 2.2 | 2.2 |
| Water, percent | 0.8 | 0.8 |
| 2,2-bis(4-hydroxyphenyl)propane | 14.2 | 14.2 |
| By-products, percent | 8.6 | 5.1 |

It will be noted that at this stage of the reaction the concentration of weight percent by-products concentration is greatly lessened (5.1% vs. 8.6%).

The evaporation zone, herein referred to as the concentrator 18 is suitably any commercial continuous film-type evaporator with counter-current vapor-liquid flow and is preferably operated under reduced pressure. The evaporator feed in line 17 consisting of phenol, unreacted acetone, water of condensation, 2,2-bis(4-hydroxyphenyl)propane and acetone-phenol reaction by-products continuously enters the concentrator 18 wherein the pressure is sufficiently low, e.g. 200 mm. Hg abs., to permit the removal of unreacted acetone and water of condensation from the concentrator product by evaporation. The bottom is passed into line 19 at a temperature preferably below 150° C. The amount of evaporation is controlled so that acetone and water are substantially completely removed from the concentrator product. Also a portion of phenol is removed so that a constant concentration of the components in the concentrator product is maintained. The preferred amount of evaporation which meets the above requirements is about 20 weight percent of the feed stream to the concentrator.

The concentrator bottoms now containing substantially only 2,2-bis(4-hydroxyphenyl)propane, phenol and acetone-phenol reaction by-products is continuously passed through line 19 to a crystallization zone most suitably consisting of a cooling type crystallizer 20 equipped with sufficient means for circulating the magma and a means for heat removal and temperature control.

In an alternative embodiment there is placed in line 19 a rearrangement reactor 47' which like rearrangement reactor 47 to be fully described hereinbelow is a chamber packed with phenol solvent-saturated cation exchanging resin such as Dowex 50–X–4 which preferably has been partially esterified with a mercapto ethanol promotor as described in the Apel et al. application, Serial No. 768,-050. The rearrangement reaction in reactor 47' is the same as occurs in reactor 47 in the preferred embodiment.

Cooling of the mass to a temperature of preferably about 40° C. with the aforementioned agitation in the crystallization zone results in a slurry of crystals consisting only of the 1:1 molar adduct of phenol and 2,2-bis-(4-hydroxyphenyl)propane in its mother liquor. The resulting slurry is passed through line 21 to a solids-liquid separation zone.

The solids-liquid separation zone comprises a solids-liquid separator 22, suitably a filtration apparatus, and preferably a centrifugal machine equipped with accessories for crystal washing and a means for temperature control. The separation of mother liquor from crystals is preferably carried out at a temperature of about 40° C.

The crystals, after separation from their mother liquor, are washed with anhydrous phenol from line 25, the amount of wash and the particular washing techniques used depending on the end product purity desired. A final separation of the crystals, consisting only of the 1:1 molar adduct of phenol and 2,2-bis(4-hydroxyphenyl) propane from the wash liquor is carried out suitably in a filtration apparatus and preferably in a centrifugal machine equipped with accessories for crystal washing and a means for temperature control. The mother liquor is passed through line 23, and a portion of the wash liquor is passed through line 26 and then these are combined and returned along line 27 ultimately to the reactor feed tank 11 as recycle. The combined mother liquor and wash liquor to be used as recycle which consists of phenol, acetone-phenol reaction by-products and 2,2-bis (4-hydroxyphenyl)propane is passed to the rearrangement zone 47 along line 27, if not previously rearranged in rearrangement reactor 47' or if both rearrangement zones are being employed.

A comparison of typical material balances at this stage of the process between the process without the rearrangement step and the process with the rearrangement step follows:

|  | Process Without Rearrangement Step | Process With Rearrangement Step |
|---|---|---|
| Phenol, percent | 81.8 | 86.4 |
| 2,2-bis(4-hydroxyphenyl)propane | 7.0 | 7.0 |
| By-products, percent | 11.2 | 6.6 |

It will be noted that at this stage the weight percent concentration of by-products is again substantially lowered (6.6% vs. 11.2%).

The purity of the crude product, the 1:1 molar adduct of 2,2-bis(4-hydroxyphenyl)propane and phenol in a process without the rearrangement step is generally about 62%. Addition of the rearrangement step upgrades the crude product purity to 73.6% typically. This enables more efficient and more effective purification and higher productivity of purer product more easily.

The mixture entering rearrangement reactor 47 from line 27 contacts the phenol solvent-saturated cation exchanging resin catalyst which preferably has been partially esterified with a mercapto alcohol. The resin is disposed as a porous bed in the reactor which is suitably an elongated chamber provided with means for temperature control. In the rearrangement reactor 47 a portion of the phenol-acetone reaction by-products is further reacted, i.e. is rearranged by contact with the catalyst to the 2,2-bis(4-hydroxyphenyl)propane.

The rearrangement reactor effluent is then passed along line 48 to feed tank 11 for recycling through the process.

A comparison of typical material balances at this stage of the process follows:

|  | Process Without Rearrangement Step | Process With Rearrangement Step |
|---|---|---|
| Phenol, percent | 86.1 | 81.8 |
| 2,2-bis(4-hydroxyphenyl)propane | 8.3 | 7.0 |
| By-products, percent | 5.6 | 11.2 |

The remainder of the wash liquor from solid-liquid separator 22 line 28 to be combined with the reactor effluent stream in line 16 for feed to the concentrator through line 17.

The washed crystals of the 1:1 molar adduct of phenol and 2,2 - bis(4 - hydroxyphenyl)propane are discharged from the solids-liquid separation zone along line 29 to a melting zone, suitably a melter 30 such as an agitated tank with a means for temperature control, wherein the crystals are melted at a temperature about 130° C. into a melt of 2,2-bis(4-hydroxyphenyl)propane in phenol. The melt is fed along line 31 to a final evaporation zone. In the final evaporation zone, which suitably comprises one or more commercial, film type evaporators 32, the phenol is evaporated from the 2,2-bis(4-hydroxyphenyl) propane product preferably at a pressure sufficiently low (e.g. 5 mm. Hg abs.) to insure complete evaporation of phenol from the evaporator product, at a temperature not exceeding 200° C.

The evaporator product consisting of a molten stream of 2,2-bis(4-hydroxyphenyl)propane of high purity is passed through line 33 to a cooling zone, suitably a rotating drum flaker.

The distillate from the final evaporation passes along line 36 to be combined with anhydrous phenol which enters the process from an outside source along line 24.

The distillate from the concentrator 18 consisting of some phenol, unreacted acetone and water of reaction are passed along line 37 to a distillation zone to recover essentially anhydrous acetone and phenol for recycle. The distillation zone can consist of two columns 38 and 41 each consisting of a stripping section, a rectification section and a reboiler, and equipped with temperature and reflux ratio control. The distillate from the concentrator enters the column 38 at about the midpoint; dry acetone enters the column at the reboiler along line 44. Acetone and water are stripped from the feed to the column, and an essentially anhydrous mixture of phenol and acetone is obtained at the bottom of the column and is returned along line 39 to the reactor feed tank 11 as recycle. The composition of the distillate from column 38 is controlled by adjusting the temperature at the top of the column. This distillate, consisting only of acetone and water, leaves the column 38 along line 40 and enters a second column 41 wherein the acetone and water are separated—water leaving the column as bottoms along line 42 and dry acetone leaving the column as distillate along line 43. A portion of the dry acetone from column 41 is combined with the anhydrous phenol-acetone mixture from column 38 along line 45 to be recycled to the reactor feed tank 11 along line 46. The remainder of the dry acetone from column 41 is returned to the bottom of column 38 by line 44 to be reused in that column. The columns are preferably operated at about atmospheric pressure.

The following examples are illustrative of the practice of our invention and are not to be construed as limitive thereof. All percentages are by weight.

EXAMPLE I

A typical effluent mixture which was to be recycled to the reaction zone in the process of Apel et al., Serial No. 768,409 above-mentioned and comprising

|  | Percent by weight |
|---|---|
| Phenol | 80.6 |
| Water | 0.7 |
| 2,2-bis(4-hydroxyphenyl)propane | 4.3 |
| Acetone-phenol reaction by-products | 14.4 | was passed to a tubular rearrangement reaction vessel 6' long by 4" inside diameter packed with 12 pounds of a cation exchange resin catalyst (sulfonated styrene 4% divinyl benzene copolymer marketed by Dow Chemical Company as Dowex 50–X–4) which had been 20% esterified with mercapto ethanol in the manner of application Serial No. 768,050 of Apel et al. above mentioned and then phenol-solvent saturated to render it anhydrous by immersion in melted anhydrous phenol. The amounts of catalyst used was 4.0 milliequivalents of $H^+$ per gram of dry resin. The effluent mixture was preheated to 75° C. and maintained at that temperature while in contact with the catalyst. The feed rate to the reactor was 20 pounds per hour.

After steady-state conditions had been achieved samples of the effluent from the rearrangement reactor were collected. The samples were stripped of phenol by heating to 200° C. at 1 mm. Hg absolute pressure. The by-product content of the residue was then determined by first extracting with carbon tetrachloride the 2,2-bis(4-hydroxyphenyl)propane and other by-products, then cooling the solvent to precipitate the 2,2-bis(4-hydroxyphenyl)propane and then measuring the light absorption of the by-product solution and comparing it with a standard. The analysis was the same as was carried out on the unrearranged effluent. The results of the analysis of rearranged effluent are given in Table I below. Data on the unrearranged effluent mixture analysis is repeated for convenience.

*Table I*

|  | Rearranged (Example I), percent | Unrearranged, percent |
|---|---|---|
| Phenol | 80.9 | 80.6 |
| Water | 0.4 | 0.7 |
| 2,2-bis(4-hydroxyphenyl)propane | 6.8 | 4.3 |
| Acetone-Phenol Reaction By-products | 11.9 | 14.4 |

EXAMPLE II

The procedure of Example I was repeated using the same catalyst but different effluent mixture. Results of the rearrangement reaction are presented in Table II. Values for the unrearranged samples are presented for comparison.

*Table II*

|  | Rearranged (Example II), percent | Unrearranged, percent |
|---|---|---|
| Phenol | 84.5 | 84.5 |
| Water | 0.2 | 0.2 |
| 2,2-bis(4-hydroxyphenyl)propane | 9.6 | 6.0 |
| Acetone-Phenol Reaction By-products | 5.7 | 9.3 |

EXAMPLE III

The procedure of Example I is followed but using as the effluent stream to be rearranged the product of the sulfuric acid catalyzed condensation of acetone and phenol. The catalyst for the rearrangement is again the catalyst of Example I. A marked rearrangement of the reaction by-products to 2,2-bis(4-hydroxyphenyl)propane is obtained.

This example illustrates the broad applicability of the process of this invention to phenol-acetone reaction streams whatever the condensation catalyst.

What is claimed is:

1. In the process for the production of 2,2-bis(4-hydroxyphenyl)propane comprising reacting phenol and acetone together under substantially anhydrous conditions in a reaction zone in contact with an acidic condensing agent, withdrawing from the reaction zone an effluent comprising 2,2-bis(4-hydroxyphenyl)propane, phenol, acetone, water and acetone-phenol reaction by-products, concentrating the effluent by removal of substantially all of the acetone and the water, and removing 2,2-bis(4-hydroxyphenyl)propane from the effluent, the improvement which consists essentially of contacting the concentrated acetone-free effluent, having a diminished 2,2-bis(4-hydroxyphenyl)propane content and a water content of less than 0.5 percent by weight, with a porous mass of substantially anhydrous insoluble phenol-saturated cation exchanging resin disposed in a rearrangement zone, further reacting at least a portion of the acetone-phenol reaction by-products to 2,2-bis(4-hydroxyphenyl)propane and passing the rearrangement zone effluent to said reaction zone.

2. In the process for the production of 2,2-bis(4-hydroxyphenyl)propane comprisnig reacting phenol and acetone together under substantially anhydrous conditions in a reaction zone comprising a porous mass of substantially insoluble phenol-saturated cation exchanging resin, withdrawing from the reaction zone an effluent comprising 2,2-bis(4-hydroxyphenyl)propane, phenol, acetone, water and acetone-phenol reaction by-products, concentrating the effluent by removal of substantially all of the acetone and the water, and removing 2,2-bis(4-hydroxyphenyl)propane from the effluent, the improvement which consists essentially of contacting the concentrated acetone-free effluent, having a diminished 2,2-bis(4-hydroxyphenyl)propane content and a water content of less than 0.5 percent by weight, with a porous mass of substantially anhydrous insoluble phenol-saturated cation exchanging resin disposed in a rearrangement zone and maintained at a temperature of from 60° to 90° C., further reacting at least a portion of the acetone-phenol reaction by-products to 2,2-bis(4-hydroxyphenyl)propane and passing the rearrangement zone effluent to said reaction zone.

3. In the process for the production of 2,2-bis(4-hydroxyphenyl)propane comprising reacting phenol and acetone together under substantially anhydrous conditions in a reaction zone comprising a porous mass of substantially insoluble phenol-saturated cation exchanging resin, withdrawing from the reaction zone an effluent comprising 2,2-bis(4-hydroxyphenyl)propane, phenol, acetone, water and acetone-phenol reaction by-products, concentrating the effluent by separating substantially all the water and acetone therefrom and removing 2,2-bis(4-hydroxyphenyl)propane from the effluent, the improvement which consists essentially of contacting the concentrated acetone-free effluent, having a diminished 2,2-bis(4-hydroxyphenyl)propane content and a water content of less than about 0.5 percent by weight, with a porous mass of substantially anhydrous insoluble phenol-saturated cation exchanging resin disposed in a rearrangement zone and maintained at a temperature of from 50 to 100° C., further reacting at least a portion of the acetone-phenol reaction by-products to 2,2-bis(4-hydroxyphenyl)propane and passing the rearrangement zone effluent to said reaction zone.

4. In the process for the production of 2,2-bis(4-hydroxyphenyl)propane comprising reacting phenol and acetone together under substantially anhydrous conditions in a reaction zone comprising a substantially insoluble phenol-saturated cation exchanging resin which has been partially esterified with a mercapto alcohol, withdrawing from the reaction zone an effluent comprising 2,2-bis(4-hydroxyphenyl)propane, phenol, acetone, water and acetone-phenol by-products comprising predominantly 2,4'- dihydroxy-2,2-diphenyl propane, concentrating the effluent by separating substantially all of the water and acetone therefrom and removing the 2,2-bis(4-hydroxyphenyl) propane as a 1:1 molar adduct with phenol, the improvement which consists essentially of contacting the concentrated acetone-free effluent, when it has a water content of less than 0.5 percent by weight, with a porous mass of substantially anhydrous insoluble phenol-saturated cation exchanging resin partially esterified with a mercapto alcohol disposed in a rearrangement zone at a temperature of from 60 to 100° C., further reacting at least a portion of the 2,4'-dihydroxy-2,2-diphenyl propane to 2,2-bis(4-hydroxyphenyl)propane and passing the rearrangement zone effluent to said reaction zone.

References Cited by the Examiner

UNITED STATES PATENTS

| | | | |
|---|---|---|---|
| 2,791,616 | 5/1957 | Luten | 260—619 |
| 3,049,569 | 8/1962 | Apel et al. | 260—619 |

FOREIGN PATENTS

| | | |
|---|---|---|
| 842,209 | 7/1960 | Great Britain. |
| 1,207,818 | 9/1959 | France. |

LEON ZITVER, *Primary Examiner.*

CHARLES B. PARKER, HAROLD G. MOORE,
*Examiners.*